United States Patent [19]

Chang

[11] Patent Number: 4,815,279

[45] Date of Patent: Mar. 28, 1989

[54] HYBRID PLUME PLASMA ROCKET

[75] Inventor: Franklin R. Chang, Webster, Tex.

[73] Assignee: The United States of America as represented by the National Aeronautics and Space Administration, Washington, D.C.

[21] Appl. No.: 46,341

[22] Filed: Apr. 13, 1987

Related U.S. Application Data

[63] Continuation of Ser. No. 781,397, Sep. 27, 1985, abandoned.

[51] Int. Cl.[4] .............................................. F03H 1/00
[52] U.S. Cl. ......................................... 60/202; 60/264; 239/265.17
[58] Field of Search .................. 60/202, 203.1, 204, 60/39, 462, 265, 264, 231; 239/127.3, 265.17

[56] References Cited

U.S. PATENT DOCUMENTS

| | | | |
|---|---|---|---|
| 2,862,099 | 11/1958 | Gage | 60/203.1 |
| 2,906,858 | 9/1959 | Morton, Jr. | 60/203.1 |
| 3,005,338 | 10/1961 | Libby et al. | 60/265 |
| 3,013,384 | 12/1961 | Smith, Jr. | 60/203.1 |
| 3,119,233 | 1/1964 | Wattendorf et al. | 60/202 |
| 3,151,449 | 10/1964 | Manson | 239/127.3 |
| 3,173,248 | 3/1965 | Curtis et al. | 60/202 |
| 3,239,130 | 3/1966 | Naundorf, Jr. | 60/202 |
| 3,360,682 | 12/1967 | Moore | 60/202 |
| 3,520,139 | 7/1970 | Elkind et al. | 239/127.3 |
| 4,369,920 | 1/1983 | Schmidt | 60/265 |
| 4,663,932 | 5/1987 | Cox | 60/202 |

FOREIGN PATENT DOCUMENTS 570334 2/1959 Canada ................................ 60/264

*Primary Examiner*—Donald E. Stout
*Attorney, Agent, or Firm*—Hardie R. Barr; John R. Manning; Edward K. Fein

[57] ABSTRACT

A technique for producing thrust by generating a hybrid plume plasma exhaust is disclosed. A plasma flow is generated and introduced into a nozzle which features one or more inlets positioned to direct a flow of neutral gas about the interior of the nozzle. When such a neutral gas flow is combined with the plasma flow within the nozzle, a hybrid plume is constructed including a flow of hot plasma along the center of the nozzle surrounded by a generally annular flow of neutral gas, with an annular transition region between the pure plasma and the neutral gas. The temperature of the outer gas layer is below that of the pure plasma and generally separates the pure plasma from the interior surfaces of the nozzle. The neutral gas flow both insulates the nozzle walls from the high temperatures of the plasma flow and adds to the mass flow rate of the hybrid exhaust. The rate of flow of neutral gas into the interior of the nozzle may be selectively adjusted to control the thrust and specific impulse of the device.

6 Claims, 6 Drawing Sheets

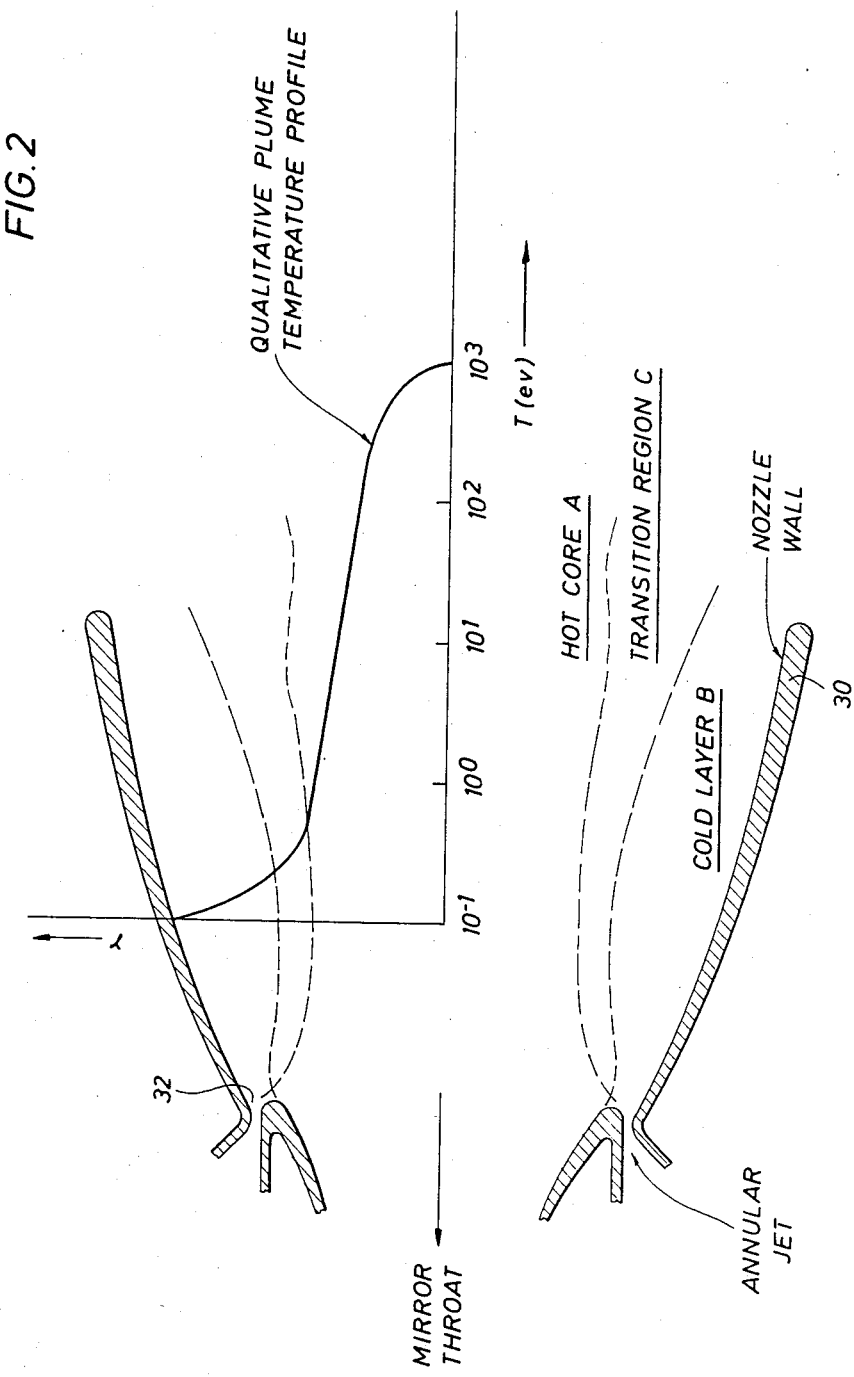

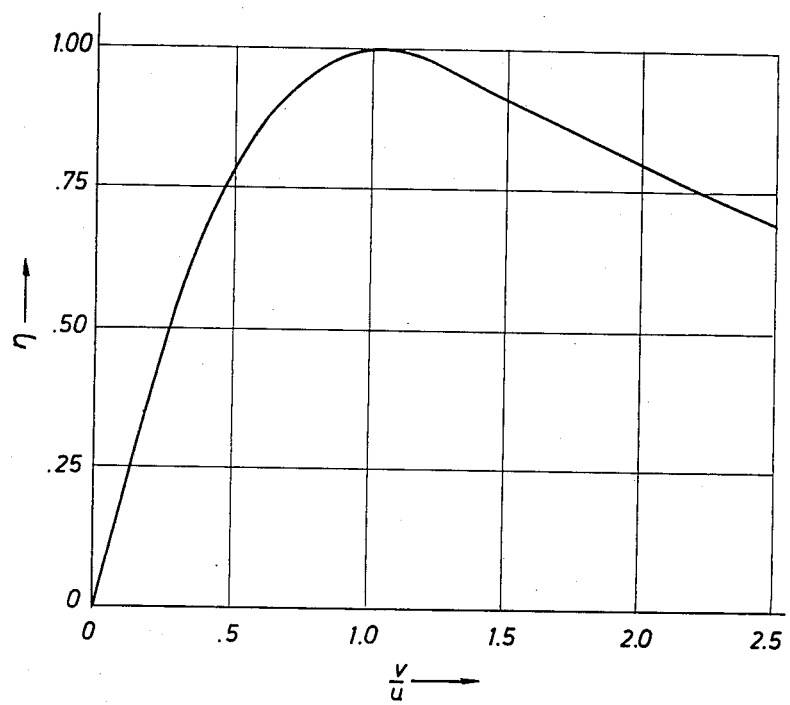
FIG. 7 PROPULSIVE EFFICIENCY η AS A FUNCTION OF VELOCITY RATIO
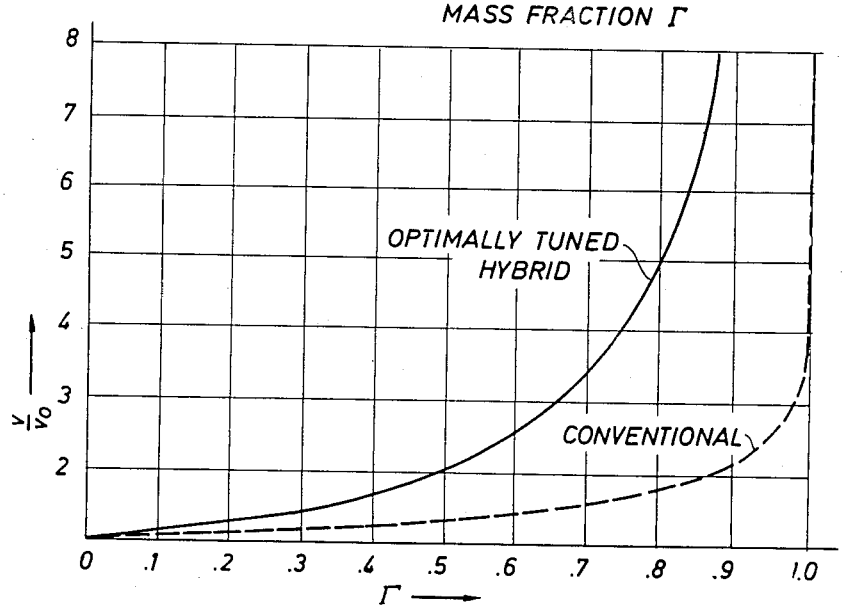
FIG. 8 NORMALIZED TERMINAL VELOCITY $V/V_0$ AS A FUNCTION OF THE MASS FRACTION $\Gamma$

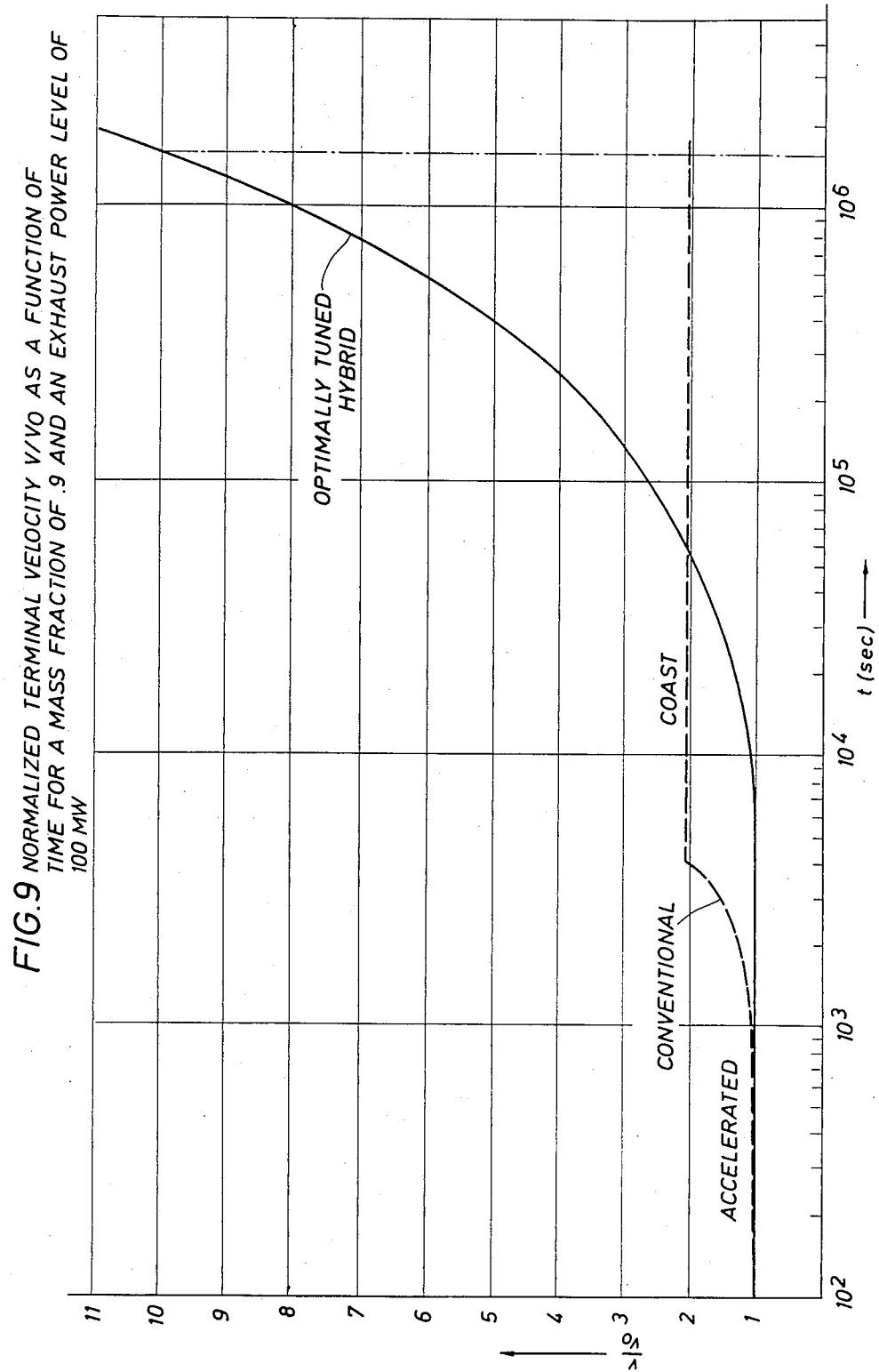
FIG. 9 NORMALIZED TERMINAL VELOCITY V/V0 AS A FUNCTION OF TIME FOR A MASS FRACTION OF .9 AND AN EXHAUST POWER LEVEL OF 100 MW

HYBRID PLUME PLASMA ROCKET

ORIGIN

The invention described herein was made by an employee of the United States Government and may be manufactured and used by or for the Government of the United States of America for governmental purposes without the payment of any royalties thereon or therefor.

This is a continuation of application Ser. No. 781,397, filed 9/27/85, now abandoned.

BACKGROUND OF THE INVENTION

1. Field of the Invention

The present invention pertains to apparatus and method for producing exhaust flow, for providing thrust, for example. More particularly, the present invention relates to techniques for producing thrust for propulsive purposes, such as by rocket engines, and finds particular application in the field of engines for space travel.

2. Brief Description of the Prior Art

In general, the thrust provided by a rocket is directly proportional to both the exhaust mass flow rate of the rocket plume and the temperature of the plume. The specific impulse is directly proportional to the velocity of the exhaust particles, which in turn is also proportional to the plume temperature. High specific impulse is consistent with efficient propulsion. The desired high temperature, however, is limited by the temperature limits of the materials of which the rocket is constructed and, in the case of chemical rockets, to temperatures characteristic of chemical reactions. Presently, rockets achieve high thrust mainly due to a large mass flow rate rather than high temperature. Such devices are heavy and, because they must carry large quantities of fuel, cannot burn very long. Plasma thrusters, on the other hand, achieve very high temperatures, that is, their exhaust particles achieve very high velocities. However, their mass flow rates are generally low, thereby limiting the thrust available. Furthermore, the temperature of a plasma exhaust is still limited by the material used to construct a nozzle for directing the plasma exhaust.

It is highly desirable and advantageous to provide a thruster which can generate and expel a plume whose temperature is not limited by the material of the exhaust nozzle, for example, and which would also produce a high mass flow rate. Further, it would be desirable and advantageous to provide such a thruster whose plume mass flow rate and temperature are selectively adjustable so that the resulting plume velocity may be maintained as close as possible to the speed of the vehicle being propelled by the thruster to maximize the propulsive efficiency, that is, the measure of the efficiency of using available thrust.

Gas layers have been used as fuel injection in plasma confinement devices. In such cases, relatively small amounts of gas have been so utilized to avoid quenching of the plasma. The present invention employs a cool gas layer within the exhaust nozzle of a plasma engine to establish a hybrid plume, that is, a plume wherein the fluid properties exhibit drastic variation from one radial position to another.

SUMMARY OF THE INVENTION

The present invention provides technique for producing thrust, such as by a rocket engine, including use of a plasma generator and a magnetic containment device for providing a plasma exhaust flow. A nozzle receives the plasma exhaust for directing the exhaust plume. One or more inlets are arranged to allow flow of neutral gas into the interior of the nozzle whereby the gas flow may generally surround the pure plasma flow and isolate the pure plasma from the interior surface of the nozzle.

The gas may be introduced into the nozzle from any appropriate source, and is further controlled by valves or other appropriate devices whereby the quantity and/or rate of gas introduced into the nozzle relative to the pure plasma flow may be selectively controlled.

The resulting hybrid plume constructed in the nozzle includes a central plasma flow surrounded by a generally annular neutral gas flow. The temperature of the hybrid plume varies from a relatively high value at the center of the plume to a relatively low value adjacent the nozzle walls. Consequently, the central core plasma portion of the hybrid plume may be provided at an extremely high temperature, higher than that which may be withstood by the material of which the nozzle is constructed. Additionally, the neutral gas adds selected mass rate flow to the plasma plume to increase the thrust and vary specific impulse. The ability to control the amount of gas introduced into the hybrid plume relative to the plasma flow allows for tuning of the rocket exhaust to achieve selective adjustment of the thrust and specific impulse provided and maximum propulsive efficiency.

BRIEF DESCRIPTION OF THE DRAWINGS

FIG. 2 is an enlarged schematic representation, in cross section, of a hybrid plume plasma engine nozzle constructed according to the present invention, and shown with a typical graph of temperature versus radial location superimposed on the nozzle;

FIG. 7 is a graph of propulsive efficiency as a function of the ratio of the exhaust speed to the vehicle speed for a rocket;

FIG. 8 is a graph of normalized terminal velocity as a function of mass fraction for an optimally tuned plume hybrid plasma rocket and for a conventional chemical rocket; and FIG. 9 is a graph of normalized terminal velocity as a function of time for an optimally tuned hybrid plume rocket and for a conventional chemical rocket.

DESCRIPTION OF PREFERRED EMBODIMENTS

Figure 1:
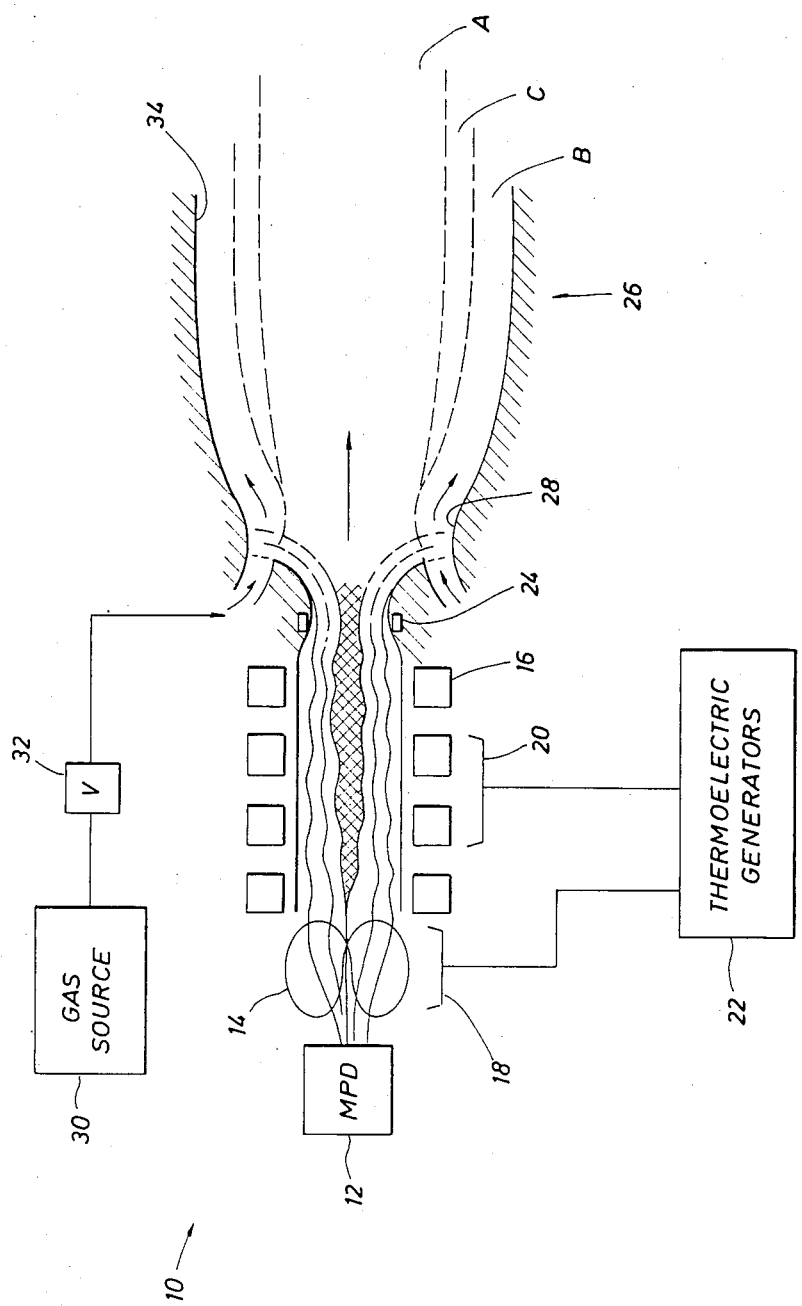
FIG. 1 is a schematic representation of a thruster by which a hybrid plasma plume is generated according to the present invention.

A hybrid plume plasma thruster according to the present invention is shown generally at 10 in FIG. 1. The plasma engine 10 includes a plasma particle injector 12, such as a magneto plasma dynamic (MPD) generator, commonly known as a Marshall gun, and a containment and power boosting system featuring one or more focusing and confining "baseball" coils 14, and electromagnetic solenoid coils 16 used to establish a confinement field to contain the plasma shown within the coils. The established plasma within the coils may be further energized by electromagnetic energy from microwave antennas 18 and 20, operated at the ion cyclotron frequency by thermoelectric generators 22 powered by an appropriate power source (not shown). The plasma generator thus described comprises an asymmetric tandem mirror plasma generator, lacking containment coils at its right end, as viewed in FIG. 1, permitting the plasma to exhaust at that end. One or more mirror coils 24 focus the plasma at the exit end.

The exiting plasma flow would normally diverge as indicated, but here enters the feed end of a nozzle, shown generally at 26, which further confines and directs the flow of the plasma.

Upstream of the nozzle entrance the plasma is insulated from the duct by the magnetic field; whereas downstream the boundary layer provides,. the insulation. This transition from one mode of insulation to the other is gradual and stable but occurs over a length of a few centimeters about the nozzle throat. Of significance is the process by which the plasma becomes detached from the field lines by the presence of the gas. The gas produces a large number of collisions with the plasma so that the plasma is loosed from the field lines and moves preferentially in the direction of lower density which is downstream and slightly toward the axis.

The nozzle 26 is equipped with hypersonic jet inlets 28, arranged in an annular array surrounding the input end of the nozzle. A neutral gas flow is introduced into the nozzle through the inlets 28, the gas being provided by an appropriate gas source 30, such as a high pressure gas tank or in the liquid state by a cryogenic container. The gas flow from the source 30 is controlled by a gas flow control 32, such as a valve, by which the mass flow rate of the gas entering the nozzle 26 is selectively adjusted.

Within the nozzle 26 a hybrid plume having three general regions is created. The plasma flow generally continues along the central axis of the nozzle forming a central core A, and the neutral gas flow, which is introduced into the nozzle at the inlets 28 a short distance downstream from the point of entry of the plasma flow, moves generally along the contour of the interior surface 34 of the nozzle. The amount of neutral gas flow generated within the nozzle 26 is chosen so that a boundary layer B of relatively low temperature neutral gas is established against the interior surface 34, and extending toward the center of the nozzle as shown. Where the plasma borders and interacts with the neutral gas, a transition region C is established comprising plasma particles and neutral gas particles.

Further details of the hybrid construction of the exhaust plume established in the nozzle 26 may be appreciated by reference to FIG. 2, wherein a plot of temperature versus radial location within the nozzle is shown for a point approximately halfway along the longitudinal axis of the nozzle. The plasma particles may be heated to kiloelectronvolts (KCV) temperatures, which temperature is generally sustained along the center of the hot core A of the plume within the nozzle 26. However, the temperature drops dramatically .to the relatively cold layer B of neutral gas against the nozzle walls, with intermediate temperatures traversing the transition region C comprising both plasma and neutral gas particles. The principal reactions between the gas, which is introduced into the nozzle at one to a few atmospheres pressure, and plasma particles in the transition region C would be electron and ion impact ionization, and charge exchange between hot ions and cold neutrals. Radial particle and energy transport is mainly by diffusion.

Figure 3:
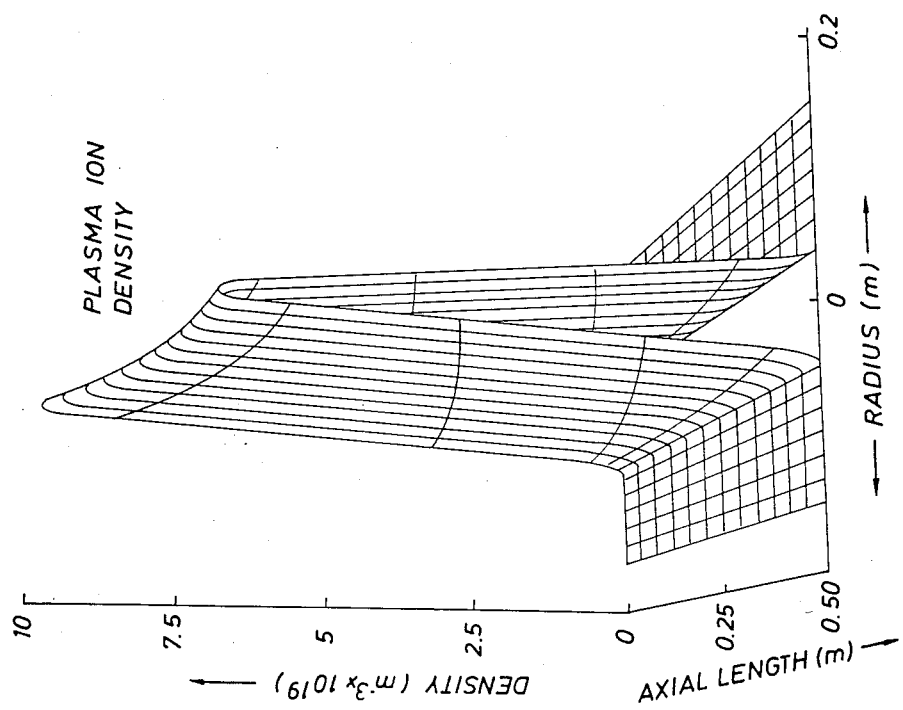
FIG. 3 is a three-dimensional graph, by numerical simulation, of plasma density along a nozzle.

FIG. 3 illustrates the variation in plasma ion density both radially and longitudinally along the interior of the nozzle for a one-half meter long nozzle of maximum width approximately three tenths of a meter. It will be appreciated from FIG. 3 that the vast majority of plasma particles are confined within the relatively narrow central core, with little expansion of the core along the length of the nozzle.

Figure 4:
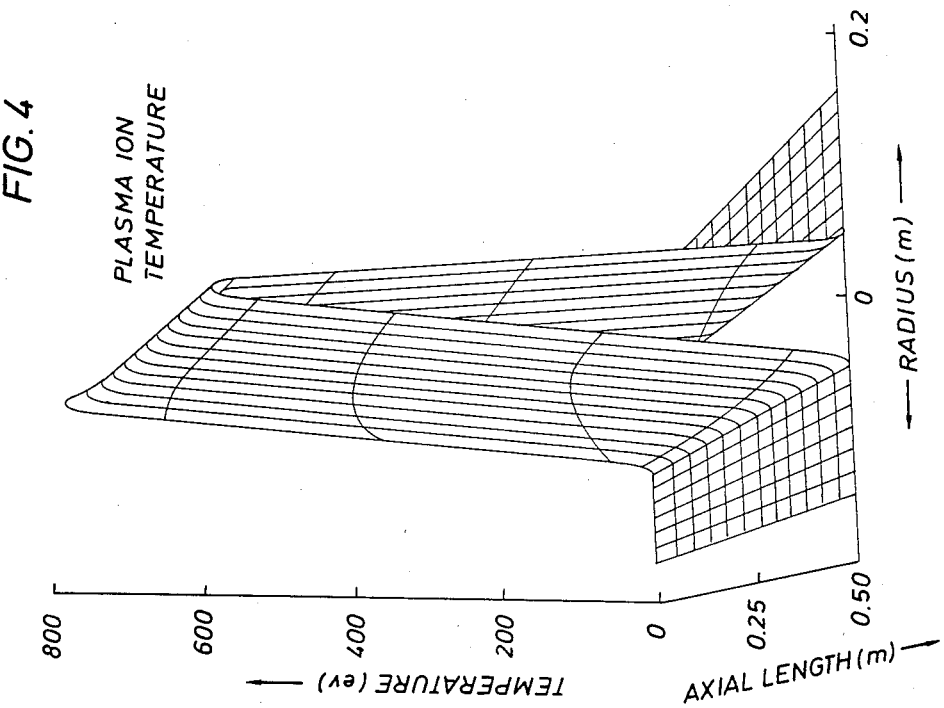
FIG. 4 is a three-dimensional graph, by numerical simulation, of plasma temperature along a nozzle.

FIG. 4 shows the variation of plasma ion temperature for the nozzle discussed in relation to FIG. 3. Again, the temperature drops dramatically from the center of the central plasma core to the transition region.

Figure 5:
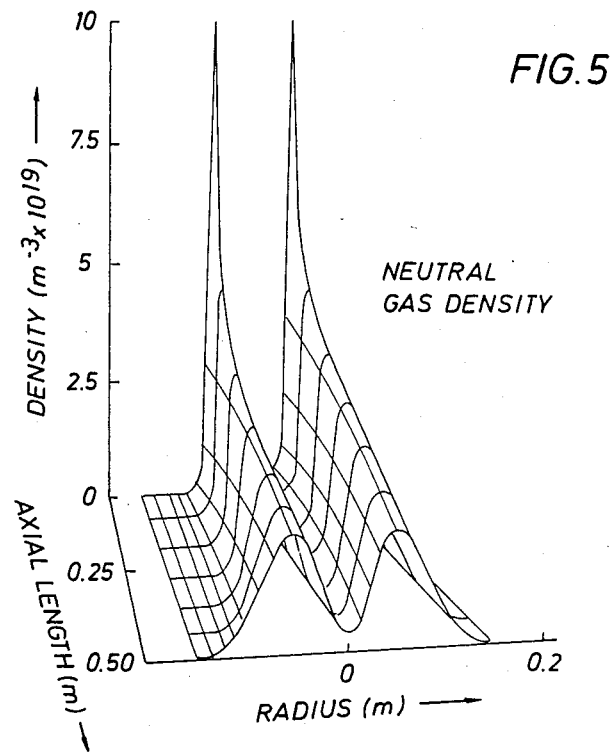
FIG. 5 is a three-dimensional graph, by numerical simulation, of neutral gas density along a nozzle.

By contrast, FIG. 5 illustrates the neutral gas density for the nozzle discussed in connection with FIGS. 3 and 4. It will be appreciated that the neutral gas density is highest in an annular region at the location of the hypersonic jet gas inlets to the interior of the nozzle, and decreases along the length of the nozzle as the neutral gas expands radially outwardly to follow the wider contour of the nozzle interior surface, and radially inwardly to mix and react with the plasma particles in the transition region. However, a relatively high density ring of neutral gas particles surrounds the pure plasma central core of the hybrid plume downstream from the gas inlets to the end of the nozzle.

Numerical modeling to achieve the plots of FIGS. 3-4 assumes two coaxial fluids in cylindrical symmetry, that is, a hot plasma core surrounded by an annular layer of neutral gas, with the two fluids then mixing in the transition region.

Figure 6:
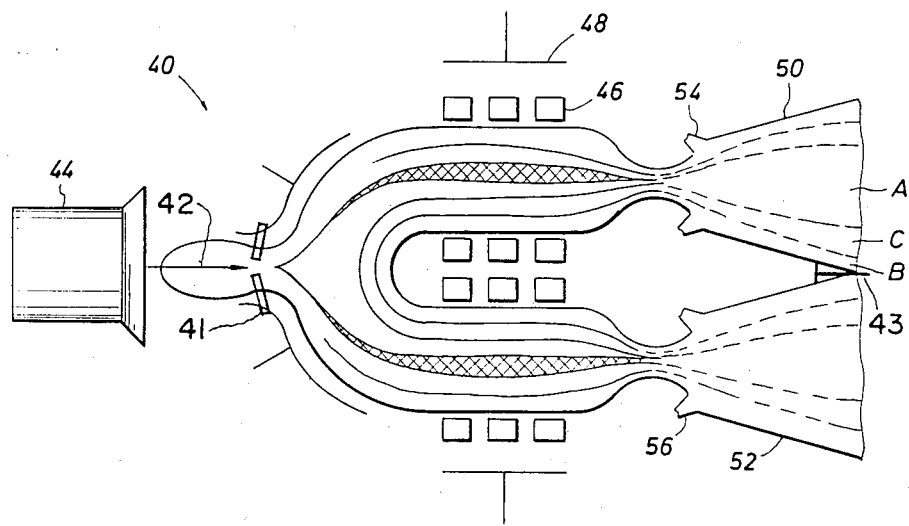
FIG. 6 is a schematic illustration of a two-nozzle hybrid plume plasma rocket engine according to the present invention.

A variation of a hybrid plasma plume thruster according to the present invention is shown generally at 40 in FIG. 6. Here a plasma is separated by divertor coils 41 into a two-prong, or "horseshoe" plasma, stabilized by a line tying plate 42 and a line tying conductor 43. A single plasma gun 44 may be utilized to maintain the plasma, and two banks of solenoid coils 46 confine the horseshoe plasma construction. Microwave antennas 48 are provided for heating the plasma particles, which may exit to the right as shown in FIG. 6 and enter appropriately placed nozzles 50 and 52. Neutral gas may enter the nozzles 50 and 52 by annular arrays of hypersonic jet inlets 54 and 56, respectively. Within each nozzle 50 and 52 an exhaust plume is comprised of a hot, central plasma core A surrounded by a relatively cool gas layer B, with an annular transition layer C comprising a mixture of plasma particles and neutral gas particles.

It will be appreciated that various other arrangements for generating and confining plasmas may be utilized in practicing the present invention. For example, to sustain an established plasma, neutral gas particles may be injected within the confining coils to fuel the plasma. In any event, the known process of providing a plasma stream, including the establishment of a plasma and the confinement and heating thereof, is utilized. The exhaust plasma stream is further controlled within a confinement device, such as the nozzles illustrated and discussed herein, although other such apparatus appropriate to the application may be employed. However, whatever form the "nozzle" may take, its inner surface may be insulated from whatever high plasma temperatures may be generated within the plasma flow by means of the neutral gas boundary layer provided by the gas flow from particles introduced through the annular arrangement of gas inlets.

Further, the mass flow rate of the gas through the interior of the nozzle may be appropriately adjusted to alter the combination of neutral gas particles and plasma particles, with an attendant variation in the thickness of the boundary layer, transition layer, and central core, for example. The thickness of the boundary layer may be expected to be maintained equal to or greater than the mean free path of the plasma particles that diffuse radially within the nozzle and at the temperatures of the plume approaching the boundary layer. The temperature gradient, illustrated in FIG. 2, for example, may vary accordingly as the ratio of neutral gas to pure plasma within the nozzle is varied. Such variations also result in modification of the thrust, and specific impulse, produced by the hybrid plasma plume since, as noted hereinbefore, thrust varies as the mass flow rate and the temperature of the plume. Consequently, a high thrust may be achieved when a space ship, for example, equipped with a hybrid plume plasma rocket, starts at relatively slow speeds, with high neutral gas infusion into the nozzles providing large mass flow rate in the nozzle exhaust. As the space ship accelerates, the neutral gas mass flow rate may be reduced to provide a nozzle exhaust whose particle velocity is higher, matching at all times the speed of the rocket-propelled ship, but whose thrust is lower. The total exhaust power remains constant. This flexibility allows for optimally tuning the engine for maximum efficiency at all phases of flight.

In the absence of gravitational effects and in free space, maximum propulsive efficiency is achieved when the exhaust particle velocity equals the velocity of the ship. By tuning the rocket engine plume, that is, by adjusting the ratio of exhaust plasma to neutral gas flowing into the nozzle inlets, propulsive efficiency can be maximized over the range of speeds of the ship, and fuel conserved. Consequently, it can be shown that a hybrid plume plasma rocket ship can travel at least three times the distance of a chemical reaction rocket ship, with the same initial amount of fuel and same payload, in the same amount of time.

The hybrid plume rocket produces a variable specific impulse. This allows the engine to be optimally tuned for all phases of flight and, when compared to a constant specific impulse engine, significantly reduces the fuel needed for the same distance and time of flight. The continuous tuning is done by matching rocket exhaust speed to vehicle speed. This procedure is utilized in order to maximize the function $$\eta = \frac{2\frac{v}{u}}{1 + \left(\frac{v}{u}\right)^2} \quad (1)$$

where $\eta$ denotes the rocket propulsive efficiency in free space and in the absence of gravitational effects. The quantities v and u denote the vehicle and exhaust velocities respectively. Optimum efficiency occurs when v=u. This function is shown plotted in FIG. 7.

This optimum efficiency is operationally obtained through the real time exchange of thrust vis-a-vis specific impulse for a fixed power level. That is, thrust and specific impulse are no longer constant but varying functions of time, or vehicle velocity, and can be readily tailored to optimize propulsive efficiency. FIG. 8 shows a comparison of terminal velocity as a function of the mass fraction for the hybrid plume rocket (solid curve) and the conventional, constant thrust and specific impulse chemical engine (dashed curve). In both of these cases, the engine power levels are equal.

Another beneficial result is increase in terminal velocity as a function of time for equal fuel loads. FIG. 9 shows an example for a 100,000 lb vehicle (engine and fuel) operating at a power level of 100 MW. This is typical of the space shuttle's orbital maneuvering engines. Here, two engines of essentially the same weight are compared. One is a conventional chemical rocket while the other is an optimally tuned, variable specific impulse hybrid. While the conventional rocket accelerates quickly, it runs out of fuel early; on the other hand, the hybrid, making more efficient use of the same fuel load accelerates more slowly but over a longer time span. By the time the hybrid reaches burnup it has nearly ten times its initial velocity having overtaken and outdistanced the conventional.

The hybrid plume also compares well in the realm of high specific impulse. Compared to the hybrid, a constant, high specific impulse engine essentially spends a comparatively longer time in the low velocity regime of equation (1), due to the fact that its acceleration is lower.

The selection of gas to utilize in the boundary layer of the plume may not be critical. Generally, light neutral gases such as hydrogen may be utilized. Typically, a plasma injection gun may utilize hydrogen, argon, or deuterium, for example. Neutral gas fuel injected into the confinement region of the engine is typically hydrogen or argon, for example.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. A space vehicle having a selectable vehicle velocity and a selectively adjustable thrust wherein the selectively thrust has an optimal propulsive efficiency in relation to the vehicle velocity, comprising:
   apparatus for producing a relatively high energy plasma flow which is characterized by a relatively high particle velocity, further comprising:
   plasma particle injector means for generating a plasma,
   energizing means for enhancing the energy of the plasma,
   confinement means for radially containing the plasma and for axially guiding the plasma by permitting the plasma to flow out only one end of the confinement means, and
   adapting means for adapting the plasma flow to produce a hybrid plume having a thrust, said adapting means comprising;
   means for producing a relatively lower energy neutral fluid flow characterized by a relatively lower temperature and a relatively lower particle velocity, nozzle means having an axis, for axially receiving the plasma flow from confinement means, and for further confining and directing the plasma flow, the nozzle means having an input end, an axially opposed exit end, and fluid inlet means near the input end for allowing neutral fluid to be introduced to annularly surround the plasma flow, neutral fluid flow injection means for injecting the relatively lower energy neutral fluid through the fluid inlet means to react with the relatively high energy plasma flow, and for controlling the mass rate of flow of the neutral fluid and thus the rate at which the plasma particles react with the neutral fluid particles, whereby
the hybrid plume having a thrust is produced, said thrust being characterized by a mean particle exit velocity, said means an particle exit velocity being the mean of the velocities of all the various hybrid plume particles at a plane near the exit end of the nozzle, and whereby further,
the space vehicle thrust and its mean particle exit velocity are capable of being varied by selective adjustment of the rate at which the neutral fluid is injected and thus, the ratio of neutral particles to plasma particles, and whereby still further,
optimal propulsive efficiency of the space vehicle thrust relative to the vehicle velocity is attainable by selective adjustment of the thrust in order to maintain the magnitude of the mean particle exit velocity near the magnitude of the vehicle velocity.

2. Apparatus of claim 1 wherein the energizing means comprise magnetic field means.

3. Apparatus of claim 1 wherein the fluid inlet means comprise one or more fluid inlets to the interior of the nozzle means.

4. Apparatus of claim 3 wherein fluid inlets comprise hypersonic jet inlets arranged in an annular array surrounding the input end of the nozzle means.

5. Apparatus of claim 1 wherein the plasma particle injector means comprise an asymmetric tandem mirror plasma generator.

6. Apparatus for generating adjustable thrust, comprising;
apparatus for producing a relatively high energy plasma flow which is characterized by a relatively high particle velocity, further comprising;
plasma particle injector means for generating a plasma,
energizing means for enhancing the energy of the plasma,
confinement means for radially containing the plasma and for axially guiding the plasma by permitting the plasma to flow out only one end of the confinement means, and
adapting means for adapting the plasma flow of produce a hybrid plume having a thrust, said adapting means comprising;
means for producing a relatively lower energy, neutral fluid flow characterized by a relatively lower temperature and a relatively lower particle velocity,
nozzle means having an axis, for axially receiving the plasma flow from the confinement means, and for further confining and directing the plasma flow, the nozzle means having an input end, an axially opposed exit end, and fluid inlet means near the input end for allowing neutral fluid to be introduced to annularly surround the plasma flow,
neutral fluid flow injection means for injecting the relatively lower energy neutral fluid through the fluid inlet means to react with the relatively high energy plasma flow, and for controlling the mass rate of flow of the neutral fluid and thus the rate at which the plasma particles react with the neutral fluid particles, whereby,
the hybrid plume having a thrust is produced, said thrust being characterized by a mean particle exit velocity, said mean particle exit velocity being the mean of the velocities of all the various hybrid plume particles at a plane near the exit end of the nozzle, and, whereby further,
the thrust of the apparatus and its mean particle exit velocity are capable of being varied by selective adjustment of the rate at which the neutral fluid is injected and thus, the ratio of neutral particles to plasma particles.

* * * * *